US011125704B2

(12) United States Patent
Aoki et al.

(10) Patent No.: US 11,125,704 B2
(45) Date of Patent: Sep. 21, 2021

(54) MEASUREMENT SYSTEM, PROGRAM, AND MEASUREMENT SYSTEM CONTROL METHOD

(71) Applicant: Rigaku Corporation, Akishima (JP)

(72) Inventors: Yu Aoki, Kyoto (JP); Tatsuya Inoue, Settsu (JP); Seiji Fujimura, Takatsuki (JP); Hiroaki Kita, Osaka (JP)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 17/058,662

(22) PCT Filed: Jun. 19, 2019

(86) PCT No.: PCT/JP2019/024233
§ 371 (c)(1),
(2) Date: Nov. 25, 2020

(87) PCT Pub. No.: WO2020/066161
PCT Pub. Date: Apr. 2, 2020

(65) Prior Publication Data
US 2021/0199606 A1 Jul. 1, 2021

(30) Foreign Application Priority Data
Sep. 28, 2018 (JP) .............................. JP2018-183775

(51) Int. Cl.
*G01N 23/223* (2006.01)
*G01N 21/25* (2006.01)
*G01N 21/95* (2006.01)

(52) U.S. Cl.
CPC ......... *G01N 23/223* (2013.01); *G01N 21/255* (2013.01); *G01N 21/9501* (2013.01); *G01N 2223/076* (2013.01)

(58) Field of Classification Search
CPC ........... G01N 23/223; G01N 2223/076; G01N 21/9501
See application file for complete search history.

(56) References Cited

U.S. PATENT DOCUMENTS 7,852,982 B2 * 12/2010 Saito .................... G01N 23/223
378/58
2006/0164656 A1 7/2006 White
(Continued)

FOREIGN PATENT DOCUMENTS

CN 1746617 A 3/2006
CN 101661008 A 3/2010
(Continued)

OTHER PUBLICATIONS

International Search Report for PCT/JP2019/024233 with English translation.
(Continued)

*Primary Examiner* — David P Porta
*Assistant Examiner* — Fani Boosalis
(74) *Attorney, Agent, or Firm* — HEA Law PLLC

(57) ABSTRACT

A measurement system obtains its own measurement result through use of a different system's measurement result obtained by a different measurement system. The measurement system includes: an output data acquisition unit, a designated position acquisition unit configured to acquire a designated position, which is a position indicating an address at which the different system's measurement result is represented in the output data, by a user's designation, a different system's measurement result acquisition unit, a measurement result acquisition unit, and a position data storage unit configured to store position data indicating the designated position. The different system's measurement result acquisition unit acquires, when the position data is already stored in the position data storage unit in a case
(Continued)

where the output data acquisition unit acquires different output data obtained by the different measurement system, the different system's measurement result included at the designated position indicated by the position data.

8 Claims, 10 Drawing Sheets

(56) References Cited

U.S. PATENT DOCUMENTS

| | | | |
|---|---|---|---|
| 2011/0080998 | A1 | 4/2011 | Saito et al. |
| 2016/0116425 | A1 | 4/2016 | Sinha et al. |
| 2017/0307551 | A1 | 10/2017 | Murakami |
| 2018/0150616 | A1 | 5/2018 | Akamaru |

FOREIGN PATENT DOCUMENTS

| | | | | |
|---|---|---|---|---|
| CN | 102403247 | A | | 4/2012 |
| CN | 106796188 | A | | 5/2017 |
| CN | 107367621 | A | | 11/2017 |
| CN | 108120732 | A | | 6/2018 |
| JP | 10318737 | A | * | 12/1998 |
| JP | H10318737 | A | | 12/1998 |
| JP | H11316201 | A | | 11/1999 |
| JP | 2002039969 | A | * | 2/2002 |
| JP | 2002039969 | A | | 2/2002 |
| JP | 2003114204 | A | | 4/2003 |
| JP | 201232239 | | * | 7/2010 ............ G01B 21/08 |
| JP | 2011154037 | A | | 8/2011 |
| JP | 2012032239 | A | | 2/2012 |
| JP | 2017532564 | A | | 11/2017 |
| WO | 2009093341 | A1 | | 7/2009 |
| WO | 2016069523 | A1 | | 5/2016 |

OTHER PUBLICATIONS

Office Action dated Mar. 25, 2021, for corresponding CN Patent Application No. 201980036260.5 with partial English translation pp. 1-10.

* cited by examiner

FIG.6

| No. | MEASUREMENT CONDITION | DIFFERENT SYSTEM'S MEASUREMENT RESULT | POSITION DATA |
|---|---|---|---|
| 1 | 0.0 | 100 | B10 |
| 2 | 45.0 | 102 | B12 |
| 3 | 45.90 | 103 | B13 |
| 4 | 45.180 | 100 | B16 |
| 5 | 45.270 | 101 | B17 |

IMPORT

PASTE FROM CLIPBOARD
IMPORT FROM CSV FILE  Imported Filename.csv

| | A | B | C | D | E | F |
|---|---|---|---|---|---|---|
| 1 | Program Name: | | | | | |
| 2 | DATE: | | | | | |
| 3 | TIME: | | | | | |
| 4 | USER ID: | | | | | |
| 5 | Sample ID:** | | | | | |
| 6 | Sample No: | | | | | |
| 7 | Slot No: | | | | | |
| 8 | | | | | | |
| 9 | No. | Thickness[nm] | | X[mm] | Y[mm] | |
| 10 | 1 | 100 | | 0 | 0 | |
| 11 | 2 | 101 | | 20 | 0 | |
| 12 | 3 | 102 | | 0 | -45 | |
| 13 | 4 | 103 | | 45 | 0 | |
| 14 | 5 | 102 | | -10 | 10 | |
| 15 | 6 | 101 | | -20 | 0 | |
| 16 | 7 | 100 | | 0 | 45 | |
| 17 | 8 | 101 | | -45 | 0 | |
| 18 | 9 | 102 | | 10 | -10 | |

☐ APPLY REFERENCE FOR ALL MEASUREMENT CONDITIONS

[CLEAR REFERENCE FOR ALL]   [OK]  [Cancel]

FIG.10

MEASUREMENT SYSTEM, PROGRAM, AND MEASUREMENT SYSTEM CONTROL METHOD

CROSS REFERENCE TO RELATED APPLICATIONS

This application is a National Stage of International Application No. PCT/JP2019/024233 filed on Jun. 19, 2019, which claims priority to Japanese Patent Application No. 2018-183775 filed on Sep. 28, 2018. The contents of each of the above documents are incorporated herein by reference in their entirety.

TECHNICAL FIELD

The present invention relates to a measurement system, a program, and a control method for a measurement system.

BACKGROUND ART

There are various devices and methods which are configured to measure characteristics of a sample by combining measurement results obtained by different measurement methods. For example, in Patent Literature 1, there is disclosed a device configured to measure, for example, a thickness of a sample by combining an ellipsometer and X-ray fluorescence analysis. In Patent Literature 2, there is disclosed a method of measuring a density of a thin film based on a film thickness of the thin film measured by an X-ray reflectivity method and a constituent element amount of the thin film measured by an X-ray fluorescent measurement method. In Patent Literature 3, there is disclosed a method involving measuring a density of a thin film based on a total reflection critical angle, and then measuring its film thickness through use of the density and an adhesion amount measured by X-ray fluorescence spectrometry. In Patent Literature 4, there is disclosed a method of inspecting a sample surface, which involves performing qualitative or quantitative analysis of an element present on a surface of a sample by an X-ray fluorescence spectrometer through use of data on a dust position on a wafer obtained by a laser dust instrument.

CITATION LIST

Patent Literature

[PTL 1] JP 2012-32239 A
[PTL 2] JP 2002-39969 A
[PTL 3] JP 10-318737 A
[PTL 4] JP 11-316201 A

SUMMARY OF INVENTION

Technical Problem

When a plurality of measurement devices configured to share, for example, the same format of measurement data are constructed as an integrated system via, for example, a host computer, measurement data of the respective devices can be used in combination, but a large cost is required. In another case, when a combined device having different measurement methods in combination is used, it is possible to easily obtain a measurement result that combines pieces of measurement data obtained by the respective methods. However, the measurement methods used in combination are limited, and such a measurement device is also extremely expensive. Therefore, separate measurement devices are commonly used. Most of the commonly-used measurement devices are capable of extracting measurement results as electronic data, but various different formats of electronic data are extracted from the respective measurement devices. Therefore, when the formats of electronic data extracted from a first measurement device and a second measurement device are different from each other, it is difficult to use the electronic data extracted from the first measurement device directly for measurement performed by the second measurement device. In many cases, a user manually inputs, to the second measurement device, a measurement result included in the electronic data extracted from the first measurement device, for example, to thereby use this measurement data for the measurement performed by the second measurement device. In particular, when the coordinate system, unit system, and other such systems of the measurement position on a sample are different, troublesome conversion is required. There are problems in that such work is inefficient and human error is liable to occur.

The present invention has been made in view of the above-mentioned problems, and an object thereof is to provide a measurement system, a measurement method, and a measurement program, which are capable of enabling a user to easily input a measurement result obtained by a different measurement system and preventing an input error.

Solution to Problem

A measurement system according to claim 1 is a measurement system, which is configured to obtain an own measurement result of the measurement system through use of a different system's measurement result obtained by a different measurement system, the measurement system including: an output data acquisition unit configured to acquire output data including the different system's measurement result, which has been obtained by the different measurement system; a designated position acquisition unit configured to acquire a designated position, which has been designated in the output data by a user; a different system's measurement result acquisition unit configured to acquire the different system's measurement result at the designated position, which is included in the output data acquired by the output data acquisition unit; a measurement result acquisition unit configured to acquire the own measurement result through use of the acquired different system's measurement result; and a position data storage unit configured to store position data indicating the designated position, wherein the different system's measurement result acquisition unit is configured to acquire, when the position data is already stored in the position data storage unit in a case where the output data acquisition unit acquires different output data obtained by the different measurement system, the different system's measurement result included at the designated position indicated by the position data.

According to the measurement system of claim 2, the measurement system of claim 1 further includes a display unit configured to display the different system's measurement result included in the output data, and the designated position acquisition unit is configured to acquire, as the position data, a position designated by the user, at which the different system's measurement result is presented, within the displayed different system's measurement result.

According to the measurement system of claim 3, the measurement system of claim 1 or 2 further includes a warning unit configured to issue a warning to the user in a case where the output data acquired when the position data is stored and the different output data have different formats.

According to the measurement system of claim 4, in the measurement system of any one of claims 1 to 3, the measurement system is an X-ray fluorescence spectrometer configured to analyze a sample based on fluorescent X-rays generated by irradiating a surface of the sample with primary X-rays.

According to the measurement system of claim 5, in the measurement system of claim 4, the sample is a substrate having a surface on which a thin film is formed, and the different system's measurement result is a film thickness or a density of the thin film or a concentration of an element contained in the thin film, which has been measured by the different measurement system.

According to the measurement system of claim 6, in the measurement system of claim 5, the output data includes a measurement position on the substrate, at which the film thickness has been measured, in association with the film thickness of the thin film, and the measurement system, being the X-ray fluorescence spectrometer, is configured to irradiate the measurement position with the primary X-rays to analyze, based on the generated fluorescent X-rays, the concentration of the element contained in the thin film or the density of the thin film.

A measurement program according to claim 7 is a program to be executed by a computer used on a measurement system, which is configured to obtain an own measurement result of the measurement system through use of a different system's measurement result obtained by a different measurement system, the program causing the computer to execute: an output data acquisition step of acquiring output data including the different system's measurement result, which has been obtained by the different measurement system; a designated position acquisition step of acquiring a designated position, which has been designated in the output data by a user; a first different system's measurement result acquisition step of acquiring the different system's measurement result at the designated position, which is included in the output data acquired in the output data acquisition step, in order to acquire the own measurement result; a position data storing step of storing position data indicating the designated position in a position data storage unit; and a second different system's measurement result acquisition step of acquiring, when the position data is already stored in the position data storage unit in a case where different output data obtained by the different measurement system is acquired in the output data acquisition step, the different system's measurement result included at the designated position indicated by the position data.

A control method according to claim 8 is a control method for a measurement system, which is configured to obtain an own measurement result of the measurement system through use of a different system's measurement result obtained by a different measurement system, the control method including: an output data acquisition step of acquiring output data including the different system's measurement result, which has been obtained by the different measurement system; a designated position acquisition step of acquiring a designated position, which has been designated in the output data by a user; a first different system's measurement result acquisition step of acquiring the different system's measurement result at the designated position, which is included in the output data acquired in the output data acquisition step; a measurement result acquisition step of acquiring the own measurement result through use of the acquired different system's measurement result; a position data storing step of storing position data indicating the designated position in a position data storage unit; and a second different system's measurement result acquisition step of acquiring, when the position data is already stored in the position data storage unit in a case where different output data obtained by the different measurement system is acquired in the output data acquisition step, the different system's measurement result included at the designated position indicated by the position data.

Advantageous Effects of Invention

According to the inventions of claims 1 to 3, 7 and 8, it is possible to enable the user to easily input the measurement result obtained by the different measurement system and prevent an input error.

According to the inventions of claims 4 to 6, the measurement result measured by the different measurement system can be easily used for the measurement using the X-ray fluorescence spectrometer.

According to the invention of claim 6, the user can easily recognize a possibility of an input error.

BRIEF DESCRIPTION OF DRAWINGS

FIG. 6 is a diagram for illustrating an example of the import screen.

FIG. 10 is a diagram for illustrating an example of the import screen.

DESCRIPTION OF EMBODIMENTS

Figure 1:
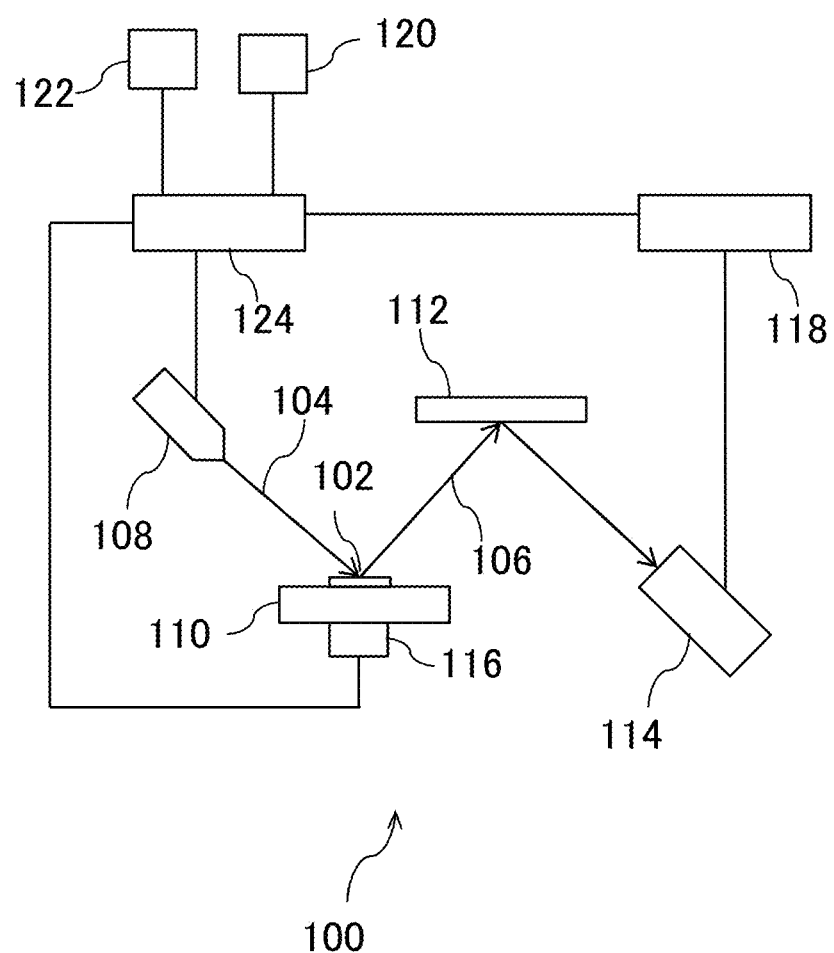
FIG. 1 is a diagram for schematically illustrating a measurement system according to an embodiment of the present invention.

Now, a preferred embodiment (hereinafter referred to as "embodiment") for carrying out the present invention will be described. FIG. 1 is a diagram for schematically illustrating a measurement system 100 according to the embodiment of the present invention. The following description is given by taking an example in which the measurement system 100 is an X-ray fluorescence spectrometer configured to analyze a sample 102 based on fluorescent X-rays 106 generated by irradiating a surface of the sample 102 with primary X-rays 104. The measurement system 100 may be a system other than the X-ray fluorescence spectrometer.

The measurement system 100 is configured to obtain its own measurement result through use of a measurement result obtained by a different measurement system (hereinafter referred to as "a different system's measurement result"). Specifically, for example, when the measurement system 100 is an X-ray fluorescence spectrometer, the X-ray fluorescence spectrometer irradiates a measurement position on the sample 102 with the primary X-rays 104 to analyze the sample 102 based on the generated fluorescent X-rays 106. The sample 102 is a substrate, for example, a wafer or a magnetic disk, having a surface on which a thin film is formed. In this case, the X-ray fluorescence spectrometer obtains an adhesion amount (content in the thin film) per unit area of an element to be analyzed, among elements contained in the thin film.

However, for example, when the substrate is a Si wafer and the thin film is a Si oxide film or another such film containing Si, the Si of the substrate (Si wafer) and the Si contained in the thin film cannot be separately measured, and hence a concentration of, for example, boron (B) or phosphorus (P) contained in the thin film cannot be accurately measured. Therefore, the X-ray fluorescence spectrometer calculates the concentration of an element contained in the thin film through use of a film thickness of the thin film measured by, for example, an ellipsometer being a different measurement system.

The measurement system 100 also divides the adhesion amount by the film thickness of the thin film measured by a different measurement system, to thereby obtain the density of the thin film as the own measurement result. In addition, when analyzing plating and coatings formed on substrates made of various materials, the measurement system 100 acquires, from a different measurement system, the film thickness, an element that cannot be measured by X-ray fluorescence analysis, or the adhesion amount of an element that cannot be accurately measured. Then, the measurement system 100 obtains the own measurement result through use of the film thickness, the element, or the adhesion amount, which has been acquired.

As illustrated in FIG. 1, the measurement system 100 includes an X-ray source 108, a sample stage 110, a spectroscopic device 112, a detector 114, sample moving means 116, a counting unit 118, a display unit 120, a warning unit 122, and an information processing unit 124.

The X-ray source 108 is configured to irradiate a surface of the sample 102 with the primary X-rays 104. The fluorescent X-rays 106 are generated from the sample 102 irradiated with the primary X-rays 104.

The sample stage 110 is configured to have the sample 102 placed thereon. Specifically, for example, the sample stage 110 has the measurement position on the sample 102 moved by the sample moving means 116. Specifically, for example, the sample moving means 116 is an XY-stage, an rθ-stage, or another such moving stage, and is configured to move the sample stage 110 to a position at which a predetermined measurement point on the sample 102 is to be irradiated with the primary X-rays 104, in accordance with an instruction issued by the information processing unit 124.

The spectroscopic device 112 is configured to receive the entering fluorescent X-rays 106 generated from the sample 102 to diffract and spectrally disperse fluorescent X-rays having a measurement target wavelength.

The detector 114 is configured to detect the fluorescent X-rays spectrally dispersed by the spectroscopic device 112. The detector 114 is further configured to output a detected signal to the counting unit 118 through, for example, a preamplifier (not shown).

The counting unit 118 is configured to output a counting result based on the fluorescent X-rays detected by the detector 114. Specifically, for example, the counting unit 118 counts the output signal from the detector 114 based on a set pulse height. The information processing unit 124 is configured to perform, for example, quantitative analysis of an element contained in the sample 102 by a calibration curve method or a fundamental parameter (FP) method based on the counting result obtained by the counting unit 118.

When a plurality of elements are analyzed, the spectroscopic device 112 and the detector 114 that correspond to the fluorescent X-rays derived from each of the elements are used. A goniometer (not shown) and a pair of the spectroscopic device 112 and the detector 114 may be caused to pivot while maintaining a constant angular relationship, to thereby sequentially measure the fluorescent X-rays derived from the plurality of elements. In another case, for example, an SDD having a high energy resolution may be used as the detector 114, and a multi-channel analyzer may be used as the counting unit 118, to thereby electrically separate respective signals based on the fluorescent X-rays derived from the respective elements and analyze the plurality of elements without use of the spectroscopic device 112.

The display unit 120 is a display device, for example, a liquid crystal display device, an organic electro-luminescence (EL) display device, or a cathode ray tube (CRT). The display unit 120 is configured to display the different system's measurement result included in output data. Specifically, for example, the display unit 120 displays not only a measurement condition and a measurement result of the measurement system 100 but also, for example, a screen (hereinafter referred to as "import screen") to be displayed to input the different system's measurement result included in the output data to the conditions for measurement to be performed by the measurement system 100, and a warning message to be presented to a user.

The warning unit 122 is configured to issue a warning to the user in a case where output data acquired when position data is stored and different output data have different formats. Specifically, for example, in the case where the output data acquired when the position data is stored and the different output data have different formats, the warning unit 122 displays, on the display unit 120, a message indicating that the formats are different. In another case, the warning unit 122 may emit a sound, to thereby alert the user. The format of the output data will be described later.

The information processing unit 124 is configured to control an operation of the measurement system 100. Specifically, for example, the information processing unit 124 is a computer (personal computer) to be used for the measurement system 100 configured to obtain the own measurement result through use of the different system's measurement result obtained by a different measurement system. The information processing unit 124 controls, for example, the sample moving means 116 and output from the X-ray source 108. The information processing unit 124 may also have a function of adjusting the number of digits of the different system's measurement result, which is acquired as a numerical value, by rounding off the number.

Figure 2:
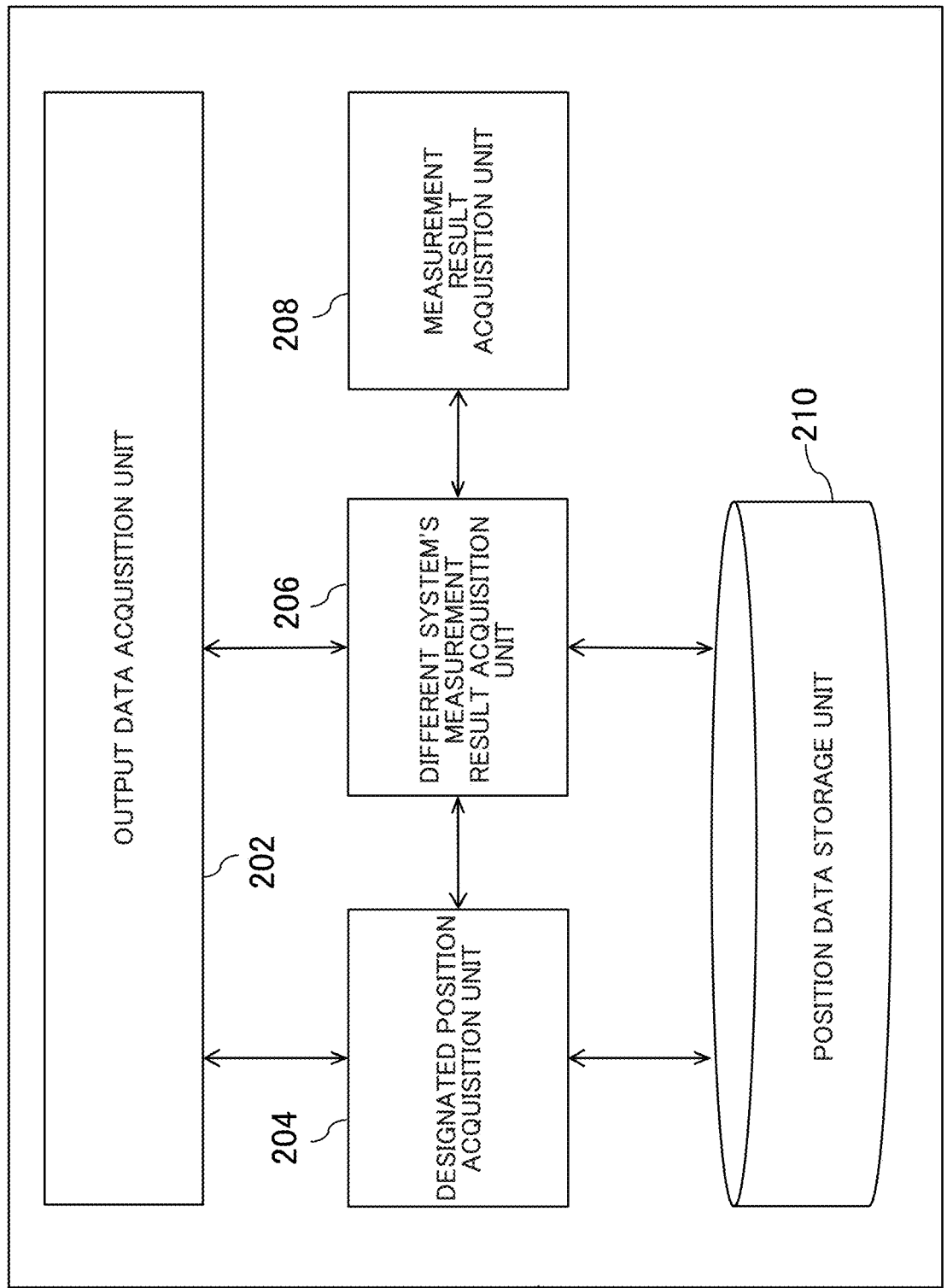
FIG. 2 is a diagram for illustrating a functional configuration of an information processing unit.

FIG. 2 is a block diagram for illustrating a functional configuration of the information processing unit 124. The information processing unit 124 includes an output data acquisition unit 202, a designated position acquisition unit 204, a different system's measurement result acquisition unit 206, a measurement result acquisition unit 208, and a position data storage unit 210.

The output data acquisition unit 202 is configured to acquire the output data including the different system's measurement result, which has been obtained by a different measurement system. Specifically, for example, the different system's measurement result is the film thickness of the thin film measured by an ellipsometer. The output data is electronic data including a numerical value representing the film thickness measured by the ellipsometer. When the measurement is performed by the ellipsometer, the output data is output as a measurement result of the ellipsometer. The output data is a comma-separated values (CSV) file in which a plurality of numerical values representing the film thicknesses are listed in a comma-separated manner. The output data may include a character string representing, for example, a measurement condition. The output data acquisition unit 202 acquires the above-mentioned CSV file including the numerical value representing the film thickness, which has been output by the ellipsometer.

The format of the output data may be another format. For example, the output data may be a tab-separated values (TSV) file in which items of data are separated by tabs, or a space-separated values (SSV) file in which items of data are separated by spaces. In addition, the different system's measurement result may be, for example, the film thickness or the density of the thin film or the concentration of the element contained in the thin film.

When the output data acquisition unit 202 acquires the output data, the display unit 120 displays the different system's measurement result included in the output data. A specific description thereof is given with reference to FIG. 3 and FIG. 4.

Figure 3:
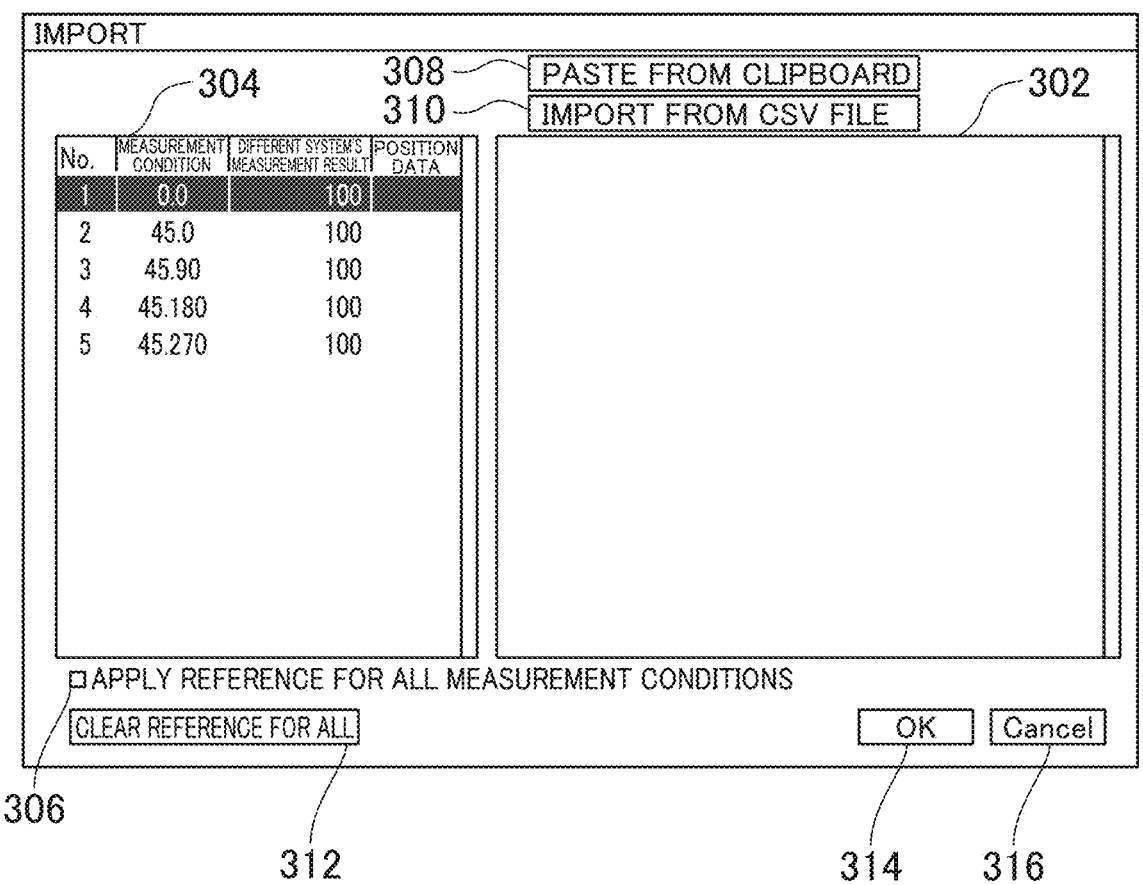
FIG. 3 is a diagram for illustrating an example of an import screen.
Figure 4:
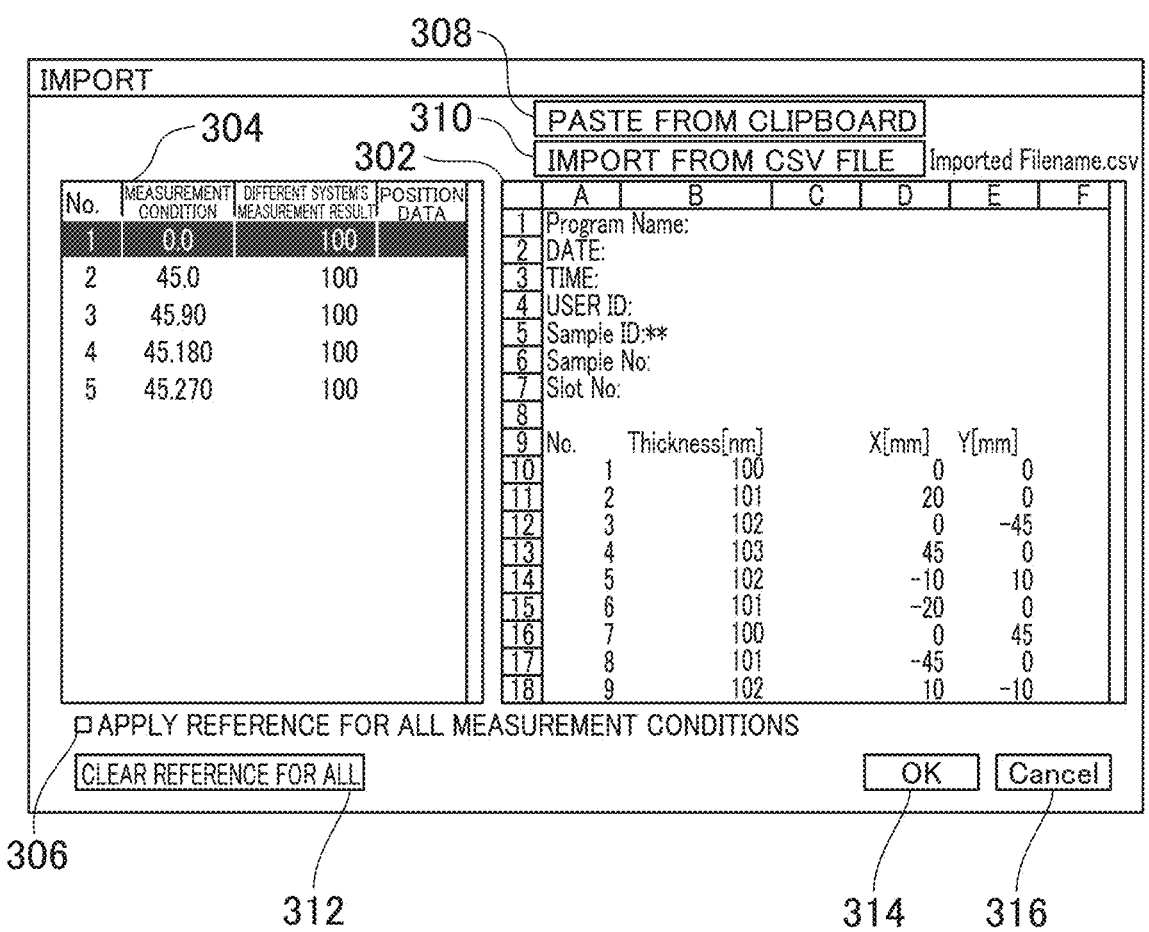
FIG. 4 is a diagram for illustrating an example of the import screen.

FIG. 3 and FIG. 4 are examples of the import screen. The import screen is displayed in a case where the user wishes to reflect the different system's measurement result in the measurement when the user creates or edits a job. The job is a series of measurement conditions in which one or a plurality of samples 102 to be measured and measurement conditions to be employed for the samples 102 are associated with each other. The following description is directed to an example of the job including measurement conditions to be employed when measurement is performed at five points on the sample 102, being one wafer.

On the import screen, for example, an output data display field 302, a management table 304, a checkbox 306 labeled as "ApplyReference for All Measurement Conditions", and various buttons are displayed. The various buttons include a "Paste from Clipboard" button 308, an "Import from CSV File" button 310, a "Clear Reference for All" button 312, an "OK" button 314, and a "Cancel" button 316.

In Examples illustrated in FIG. 3 and FIG. 4, the output data acquisition unit 202 acquires the output data when the user presses the "Paste from Clipboard" button 308 or the "Import from CSV File" button 310.

Specifically, for example, it is assumed that the user uses a text editor or other such software to access the output data obtained by a different measurement system. It is also assumed that the user then selects a part or the entirety of the output data, and copies the selected region of a different system's measurement results onto a clipboard. When the user presses the "Paste from Clipboard" button 308 in this state, the output data acquisition unit 202 acquires the output data copied onto the clipboard. As illustrated in FIG. 4, the acquired output data is displayed in the output data display field 302.

It is desired that character strings and numerical values that are displayed in the output data display field 302 be displayed in a matrix format. Specifically, as illustrated in, for example, FIG. 4, when the output data is a CSV file, the character strings and the numerical values are displayed in a different row for each line break included in the output data. The character strings and the numerical values are also displayed in a different column for each comma. When the output data is a TSV file or an SSV file, the character strings and the numerical values are displayed in a different column for each tab or each space.

In addition, coordinates for identifying a position of each frame in the matrix are assigned to each row and each column of the matrix. Specifically, for example, values of from "1" to "n" (where "n" is a natural number) are assigned to the respective rows of the matrix in order from the top. Similarly, alphabetical values are assigned to the respective columns of the matrix in alphabetical order starting from "A", from the left to the right.

In the first to eighth rows of the output data display field 302 illustrated in FIG. 4, for example, the measurement conditions for a different measurement system are displayed. In the tenth row and the subsequent rows, the measurement conditions and the different system's measurement results, which include the numbers of times of measurement, the thicknesses (film thicknesses), and measurement positions in an XY-coordinate system, are displayed. That is, in the above-mentioned Example, the output data includes the measurement position on the wafer, at which the film thickness has been measured, in association with the film thickness of the thin film.

The management table 304 includes a "No." field, a "Measurement Condition" field, a "Different System's Measurement Result" field, and a "Position Data" field. The "No." field is a field indicating the order position of measurement when the measurement is performed a plurality of times. Specifically, for example, the "No." field being "1" indicates that the measurement is performed for the first time.

The "Measurement Condition" field is a field indicating a condition for the measurement performed by the measurement system 100. Specifically, an exemplary case in which the sample 102 is a wafer and the user performs elemental analysis of the wafer at a plurality of positions is described. In this case, a value input to the "Measurement Condition" field is information representing the position on the wafer. For example, in a case of an rθ-coordinate system, when the "Measurement Condition" field indicates (0, 0), the wafer is irradiated with the X-rays at the center. When the "Measurement Condition" field indicates (45, 90), the wafer is irradiated with the X-rays at a position apart from the center of the wafer by 45 mm and rotated by 90 degrees from a predetermined position on the wafer about the center of the sample stage 110, that is, about the center of the wafer.

Figure 5:
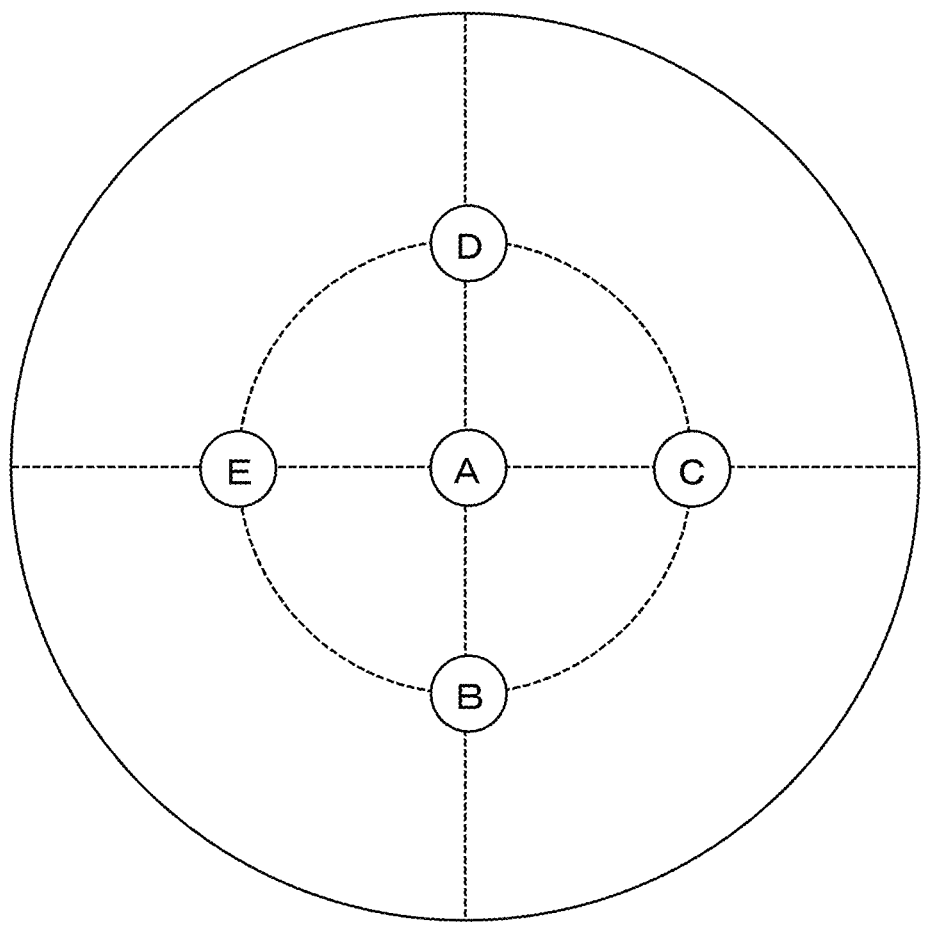
FIG. 5 is a diagram for illustrating measurement points on a substrate.

The value of the "Measurement Condition" field is also set by a method of, for example, being manually input by the user or loading a file saved in advance. In the Example illustrated in FIG. 4, the values of (0, 0), (45, 0), (45, 90), (45, 180), and (45, 270) in the rθ-coordinate system are set in the "Measurement Condition" field from the top. When a different measurement system from which it is desired to use the measurement results expresses the measurement positions in, for example, the XY-coordinate system, the above-mentioned set positions are A(0, 0), B(0, −45), C(45, 0), D(0, 45), and E(−45, 0) as illustrated in FIG. 5. Hitherto, work of examining and manually inputting corresponding parameters every time for each sample 102 and each measurement has been troublesome.

The "Different System's Measurement Result" field is a field indicating a parameter to be used for the measurement performed by the measurement system 100. The parameter to be used for the measurement performed by the measurement system 100 is, for example, a parameter to be used for processing performed when the measurement result acquisition unit 208 acquires the measurement result or a parameter indicating a measurement condition other than the measurement condition indicated in the "Measurement Condition" field.

In a case where the parameter to be used for processing performed when the measurement result is acquired is set in the "Different System's Measurement Result" field, the parameter is, for example, a film thickness. Specifically, when the measurement system 100 is an X-ray fluorescence spectrometer as described above, the measurement result acquisition unit 208 first obtains the adhesion amount of B, P, or another such element to be analyzed. The adhesion amount has a value acquired based on the intensity of the fluorescent X-rays 106 detected by the detector 114. The measurement result acquisition unit 208 calculates the adhesion amount of SiO2, which is the main component of the film, from the film thickness of a Si oxide film measured by the different measurement system, and obtains the concentration of B, P, or another such element contained in the thin film. In addition, when the density is calculated from the adhesion amount, the density is obtained by dividing the adhesion amount by the film thickness. As a parameter required for calculating the density of the thin film and the concentration of the contained element from the adhesion amount acquired by the measurement result acquisition unit 208, the film thickness of the thin film measured by the different measurement system is set in the "Different System's Measurement Result" field.

In the "Different System's Measurement Result" field, the density of the thin film measured by the different measurement system may be set. In this case, the film thickness is obtained by dividing the adhesion amount by the density. In general, the density is calculated through use of a literature value, but the film thickness can be calculated with more accuracy through use of the density measured at the actual measurement point on the sample 102. It is also possible to analyze the concentration of the element by selecting a calibration curve to be set as a measurement condition from a plurality of calibration curves, which are registered in advance, based on the density measured by the different measurement system. For the purpose of, for example, verification, the adhesion amount or the concentration of the element, which has been measured by the different measurement system, may be set.

In another example, when the measurement condition is set in the "Different System's Measurement Result" field, its parameter is a value of, for example, surface roughness. Specifically, when an irradiation diameter of the X-rays emitted by the X-ray source 108 is small, the magnitude of the surface roughness exerts an influence on the accuracy of the elemental analysis. Therefore, in order to reduce the influence of the surface roughness exerted on the measurement accuracy, it is required to increase the irradiation diameter of the X-rays. As a parameter required for applying X-rays having an irradiation diameter that does not depend on the surface roughness, the value of the surface roughness is set in the "Different System's Measurement Result" field.

In the "Different System's Measurement Result" field, the value may be set by being input by the user, or the different system's measurement result acquired by the different system's measurement result acquisition unit 206 may be set. In the example illustrated in FIG. 3, after the import screen is activated, a value of "100" is input by the user in the "Different System's Measurement Result" field in all the rows. There may also be a plurality of "Different System's Measurement Result" fields.

The "Position Data" field is a field indicating a designated position. The designated position is a position designated by the user in the output data displayed in the output data display field 302. Specifically, for example, the user selects a desired frame on the output data display field 302 with a desired row (target for setting the measurement condition) being selected on the management table 304. In this case, coordinates indicating a frame selected on the output data display field 302 are set in the "Position Data" field of the row selected on the management table 304.

When the checkbox 306 labeled "Apply Reference for All Measurements Conditions" is checked, a parameter value selected on the output data display field 302 is set in the "Different System's Measurement Result" field in all the rows of the management table 304, and the coordinates indicating the frame selected on the output data display field 302 are set in the "Position Data" field. When the "Clear Reference for All" button 312 is pressed, all values set in the "Position Data" field are deleted.

The designated position acquisition unit 204 is configured to perform an operation for acquiring the designated position, which has been designated in the output data by the user. Specifically, for example, the designated position acquisition unit 204 acquires, as the designated position, a position designated by the user, at which the different system's measurement result is presented, within the displayed output data. As illustrated in, for example, FIG. 6, it is assumed that the user sequentially selects frames of "B10", "B12", "B13", "B16", and "B17" in the output data display field 302 with the first to fifth rows being sequentially selected in the management table 304. In this case, the designated position acquisition unit 204 acquires, as the designated position, coordinates selected on the output data display field 302 in association with each selected row of the management table 304. In the "Position Data" field of the management table 304, the acquired values of "B10", "B12", "B13", "B16", and "B17" are set in order from the first row.

The different system's measurement result acquisition unit 206 is configured to acquire the different system's measurement result at the designated position, which is included in the output data acquired by the output data acquisition unit 202. Specifically, in the above-mentioned case, the different system's measurement result acquisition unit 206 acquires the different system's measurement results indicated by the frames of "B10", "B12", "B13", "B16", and "B17". That is, the different system's measurement result acquisition unit 206 acquires values of "100", "102", "103", "100", and "101" as the values of the "Different System's Measurement Result" field in order from the first to fifth rows of the management table 304. In addition, the values of "100", "102", "103", "100", and "101" are set in the "Different System's Measurement Result" field in order from the first to fifth rows.

When the position data is already stored in the position data storage unit 210 in a case where the output data acquisition unit 202 acquires different output data obtained by the different measurement system, the different system's measurement result acquisition unit 206 acquires the different system's measurement result included at the designated position indicated by the position data. This operation is described later.

The measurement result acquisition unit 208 is configured to acquire the own measurement result through use of the acquired different system's measurement result. Specifically, for example, the measurement result acquisition unit 208 acquires the adhesion amount and the concentration of the element to be analyzed and the film thickness and the density of the thin film.

The position data storage unit 210 is configured to store the position data indicating the designated position. Specifically, in the above-mentioned case, the position data storage unit 210 stores the values of "B10", "B12", "B13", "B16", and "B17".

In the above-mentioned Example, the output data includes the measurement position on the wafer, at which the film thickness has been measured, in association with the film thickness of the thin film. In addition, the measurement position on the wafer is set in the "Measurement Condition" field included in the management table 304. In view of this, the user associates the measurement position included in the management table 304 and the measurement position included in the output data with each other, to thereby be able to easily input the measurement result obtained by the different measurement system and be able to prevent an input error.

It is also common for the measurement system 100 according to the embodiment of the present invention and a different measurement system to have different formats of the output data. Specifically, as illustrated in FIG. 4 and FIG. 6, the measurement position set in the "Measurement Condition" field and the measurement position included in the output data have different coordinate systems (for example, XY-coordinate system and rθ-coordinate system). The user selects the frame on the output data display field 302 inconsideration of a difference between the coordinate systems, to thereby be able to easily input the measurement result even with the different formats. The present invention is also useful not only when the different coordinate systems are employed but also when different units are employed.

The above-mentioned respective set values and designated positions are reflected when the "OK" button 314 is pressed. The position data storage unit 210 may store the position data indicating the designated position when the "OK" button 314 is pressed. Meanwhile, when the "Cancel" button is pressed, the import screen is closed without reflecting the respective set values and designated positions.

Next, a control method for the measurement system 100 configured to obtain the own measurement result through use of the different system's measurement result obtained by a different measurement system is described with reference to flow charts of FIG. 7 and FIG. 8.

Figure 7:
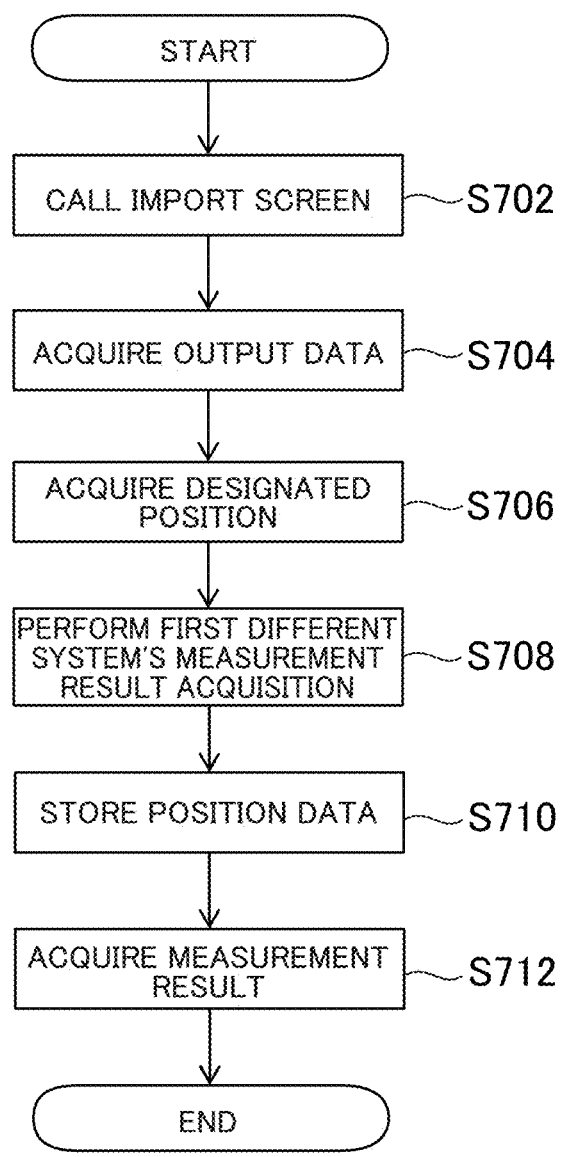
FIG. 7 is a flow chart for illustrating a control method for the measurement system.
Figure 8:
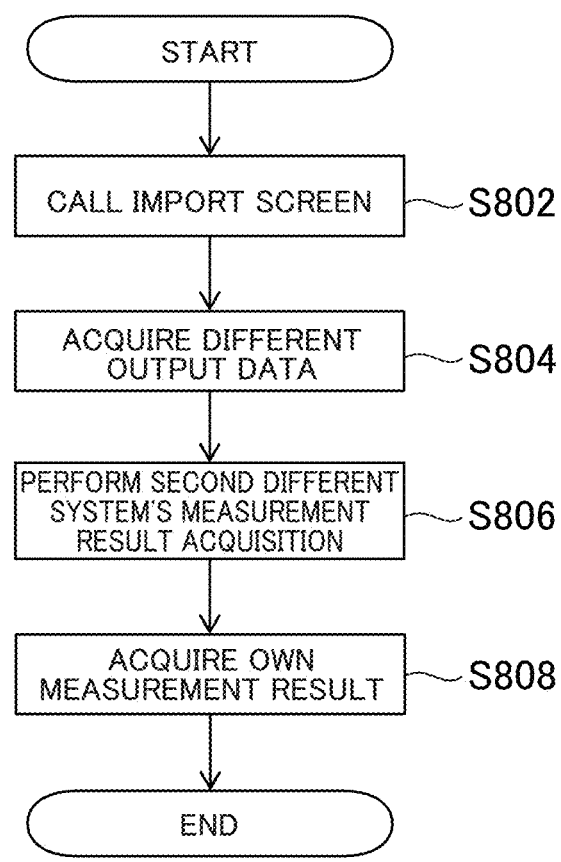
FIG. 8 is a flow chart for illustrating a control method for the measurement system.

FIG. 7 is a flow chart for illustrating a control method for the measurement system 100 to be performed when the job does not include position data. In the case where the job does not include position data, the value in the "Position Data" field is blank (null value) in all the rows when the import screen is called up.

First, when the user is to edit a job, the user calls up the import screen (Step S702: calling up step). Specifically, the display unit 120 displays an import screen such as illustrated in FIG. 3 in accordance with an operation of the user.

Subsequently, the output data acquisition unit 202 acquires output data including the different system's measurement result, which has been obtained by the different measurement system (Step S704: output data acquisition step). Specifically, for example, when the user presses the "Paste from Clipboard" button 308 or the "Import from CSV File" button 310, the output data acquisition unit 202 acquires the output data output using the ellipsometer. The character strings and the numerical values that are included in the acquired output data are displayed in the output data display field 302 as illustrated in FIG. 4.

Subsequently, the designated position acquisition unit 204 acquires the designated position, which has been designated in the output data by the user (Step S706: designated position acquisition step). Specifically, for example, as illustrated in FIG. 6, the designated position acquisition unit 204 acquires, as the designated positions, "B10", "B12", "B13", "B16", and "B17" selected on the output data display field 302 in association with the first to fifth rows of the management table 304.

Subsequently, the different system's measurement result acquisition unit 206 acquires the different system's measurement result at the designated position, which is included in the output data acquired by the output data acquisition unit 202 (Step S708: first different system's measurement result acquisition step). Specifically, the different system's measurement result acquisition unit 206 acquires the values of "100", "102", "103", "100", and "101" corresponding to "B10", "B12", "B13", "B16", and "B17", respectively, on the output data display field 302.

In the "Different System's Measurement Result" field, the different system's measurement results displayed at "B10", "B12", "B13", "B16", and "B17" in the output data display field 302 are set. That is, the values of "100", "102", "103", "100", and "101" are set in the "Different System's Measurement Result" field in order from the first to fifth rows.

Subsequently, the position data storage unit 210 stores the position data indicating the designated position in the position data storage unit 210 (Step S710: position data storing step). Specifically, the position data storage unit 210 stores the coordinates of "B10", "B12", "B13", "B16", and "B17", which are the designated positions acquired in Step S706, in association with the first to fifth rows of the management table 304. This step is performed when the user presses the "OK" button 314 or saves the job being edited.

Subsequently, the measurement result acquisition unit 208 acquires the own measurement result through use of the acquired different system's measurement result (Step S712: measurement result acquisition step). Specifically, the respective units illustrated in FIG. 1 are operated, to thereby cause the measurement result acquisition unit 208 to acquire the adhesion amount of a thin film formed on the surface of a wafer. In this case, the sample moving means 116 (rθ-stage) moves the sample stage 110, on which the wafer is placed, based on the measurement position included in the job, to thereby irradiate the respective coordinates on the wafer with the primary X-rays 104. Thus, the measurement result acquisition unit 208 acquires the adhesion amount at each position irradiated with the primary X-rays 104. The measurement result acquisition unit 208 uses the adhesion amount at each measurement position and the parameter set at the corresponding position in the "Different System's Measurement Result" field to acquire, as the own measurement result, the density of the film or the concentration of an element contained in the film.

More specifically, in the measurements in the first to fifth rows, which are included in the job, the measurement result acquisition unit 208 uses the adhesion amounts at the respective measurement positions and the set parameters of "100", "102", "103", "100", and "101" to acquire, for example, the concentrations of the element at the respective measurement positions. Thus, the measurement result acquisition unit 208 can obtain, as the own measurement result, for example, the concentration of the element contained in the thin film through use of the film thickness of the thin film measured by, for example, an ellipsometer being the different measurement system.

According to the measurement system 100 and the measurement method, which have been described above, the user can obtain the own measurement result only by selecting the different system's measurement result displayed in the output data field. Therefore, it is possible to prevent an erroneous measurement result from being obtained due to an input error made by the user.

Next, a case in which the job includes position data will be described. FIG. 8 is a flowchart for illustrating a control method for the measurement system 100 to be performed when the job includes position data. In the case where the job includes position data, a value is set in the "Position Data" field when the import screen is called. The value corresponds to the value stored in the position data storage unit 210.

Figure 9:
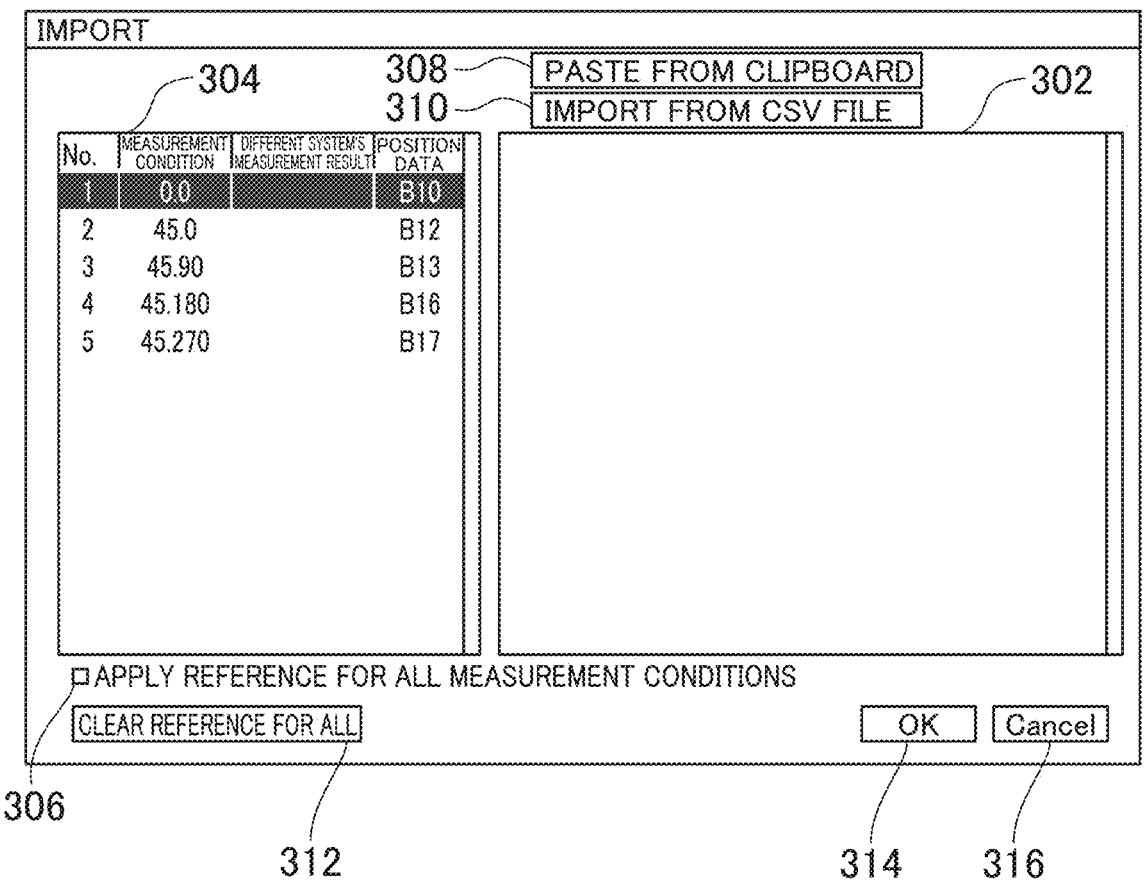
FIG. 9 is a diagram for illustrating an example of the import screen.

First, when the user is to edit a job, the user calls up the import screen (Step S802: calling up step). Specifically, the display unit 120 displays an import screen such as illustrated in FIG. 9 in accordance with an operation of the user. As illustrated in FIG. 9, unlike in FIG. 3, the designated positions that have been designated once are set in the "Position Data" field. When the flow chart illustrated in FIG. 7 is executed, the position data associated with the job being edited is stored. In a case where the job is to be edited again, when the import screen is called up in Step S802, the position data saved in the "Position Data" field is set.

Subsequently, the output data acquisition unit 202 acquires different output data, which has been obtained by the different measurement system (Step S804: different output data acquisition step). Specifically, for example, when the user presses the "Paste from Clipboard" button 308 or the "Import from CSV File" button 310, the output data acquisition unit 202 acquires the different output data output by the ellipsometer.

Figure 10:
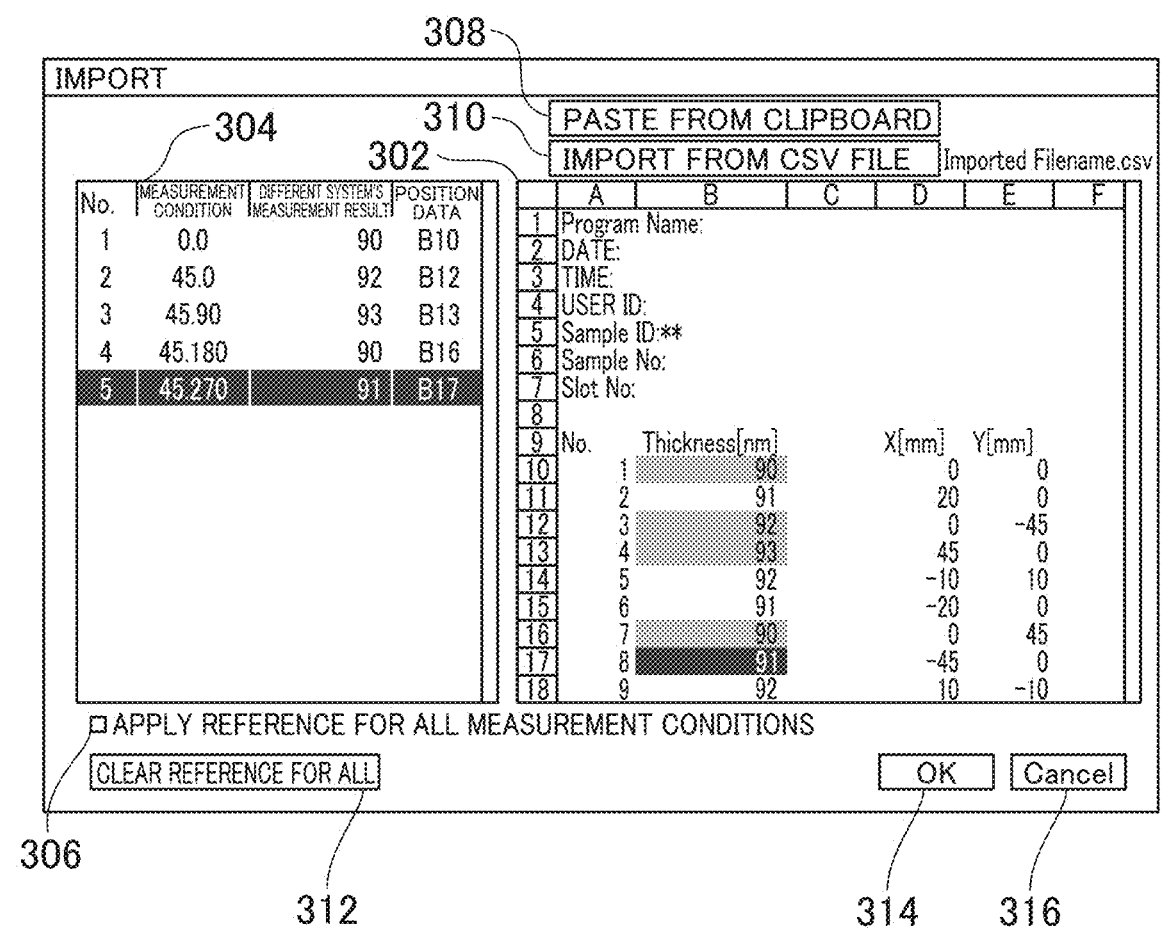

In this case, the output data acquisition unit 202 acquires output data that is different from the output data acquired in Step S704. The different output data is, for example, data output as a result of measuring a sample 102, which is a sample 102 newly set for the job, and is different from the sample 102 on which the position data has been set. In another case, the different output data may be data output as a result of measuring the same sample 102 with another different measurement system. The different output data is used, and hence the character strings and the numerical values that are displayed in the output data display field 302 are different between FIG. 6 and FIG. 10.

Subsequently, when the position data is already stored in the position data storage unit 210, the different system's measurement result acquisition unit 206 acquires the different system's measurement result included at the designated position indicated by the position data (Step S806: second different system's measurement result acquisition step). Specifically, in the "Position Data" field, the values of "B10", "B12", "B13", "B16", and "B17" are set in order from the first to fifth rows. That is, the respective values are stored in the position data storage unit 210 as the position data. Therefore, the different system's measurement result acquisition unit 206 acquires the different system's measurement results of "90", "92", "93", "90", and "91", which are included at the designated positions indicated by the items of position data of "B10", "B12", "B13", "B16", and "B17". In addition, the values of "90", "92", "93", "90", and "91" are set in the "Different System's Measurement Result" field in order from the first to fifth rows.

Subsequently, the measurement result acquisition unit 208 acquires the own measurement result through use of the acquired different system's measurement result (Step S808: own measurement result acquisition step). Specifically, in the same manner as in Step S712, the respective units illustrated in FIG. 1 are operated, to thereby cause the measurement result acquisition unit 208 to acquire the adhesion amount of a thin film formed on the surface of a wafer at each measurement position. The measurement result acquisition unit 208 also acquires the own measurement result through use of the adhesion amount at each measurement position and a parameter set at the corresponding position in the "Different System's Measurement Result" field. That is, the measurement result acquisition unit 208 uses the adhesion amounts of the element at the respective measurement positions and the film thicknesses of "90", "92", "93", "90", and "91" to acquire, for example, the concentrations of the element in the thin film at the respective measurement positions.

There is a case where the different output data acquired in Step S804 does not include the different system's measurement result. Specifically, for example, there is a case where the output data read in Step S704 and the output data read in Step S804 have different formats, and the different system's measurement result is not included (for example, a null value is included) in the frames of "B10", "B12", "B13", "B16", and "B17" in the output data display field 302. There are also a case where the different system's measurement result that is supposed to be a numerical value is text data, and a case where the numerical value has, for example, a completely different number of digits. In this case, the warning unit 122 issues a warning to the user. This allows the user to recognize that the read output data is erroneous.

With the above-mentioned operation, when the user creates a job including a designated position and subsequently performs measurement through use of the job, the user can perform the measurement with the different system's measurement result being reflected therein without designating the position again. Therefore, according to the measurement system 100 and the measurement method, which have been described above, it is possible to more easily perform the measurement with the different system's measurement result being reflected therein without an input error.

The present invention is not limited to the above-mentioned Examples and can be variously modified. The above-mentioned configuration or job is merely one example, and the present invention is not limited thereto. The configurations described in the above-mentioned Examples may be replaced by those having substantially the same configurations, those exhibiting the same action and effect, or those achieving the same object.

The exemplary case in which the measurement system 100 is an X-ray fluorescence spectrometer has been described, but the measurement system 100 may be another system. For example, the measurement system 100 may be a system configured to measure a length, a mass, a time, a current, a temperature, an amount of substance, a luminous intensity, or other such information.

Further, the case in which a different measurement system is an ellipsometer has been described, but a different measurement system may be a measurement instrument other than the ellipsometer. Specifically, for example, a different measurement system may be an X-ray reflectivity measurement system configured to measure the film thickness of a thin film by an X-ray reflectivity method or a laser dust instrument configured to acquire data of a dust position on a wafer.

In addition, the combination of the different measurement system and the measurement system 100 is not limited to the ellipsometer and the X-ray fluorescence spectrometer, and may be another combination. Specifically, a laser dust instrument being a different measurement system and a total reflection X-ray fluorescence spectrometer being the measurement system 100 may be combined with each other. In this case, the total reflection X-ray fluorescence spectrometer uses data of a dust position on a wafer obtained by the laser dust instrument to obtain an analysis result of a thin film at a position on the wafer indicated by the data of the dust position on the wafer.

Further, for example, an X-ray fluorescence spectrometer being a different measurement system and an ellipsometer being the measurement system 100 may be combined with each other. In this case, the ellipsometer obtains the film thickness of a thin film through use of the concentration of an element, the density of the thin film, or other such data, which is obtained by the X-ray fluorescence spectrometer.

In addition, for example, an X-ray fluorescence spectrometer being a different measurement system and a reflectometer being the measurement system 100 may be combined with each other. In this case, the reflectometer obtains a reflectance of a thin film through use of the concentration of an element, the density of the thin film, or other such data, which is obtained by the X-ray fluorescence spectrometer. As described above, various combinations of the measurement system 100 and a different measurement system may be used as long as the measurement system 100 uses the different system's measurement result to obtain the own measurement result.

Further, the Example in which the different system's measurement result and the own measurement result are numerical data and the different system's measurement result is used to calculate the own measurement result has been described above, but the present invention is not limited thereto. The measurement system 100 may display or output the numerical data being the different system's measurement result so that the numerical data can be compared to the own measurement result. For example, the measurement system 100 may display or output numerical data indicating the adhesion amount of an element and numerical data indicating the measurement position, which have been calculated only from the own measurement result, and numerical data indicating the film thickness at the corresponding measurement position, which has been acquired from a different measurement system, as a numerical value table or a mapping chart of a series of own measurement results. In addition, the different system's measurement result and the own measurement result are not limited to numerical data, and may be text data, image data, audio data, or other such data as long as the data can be handled by the information processing unit 124. For example, when the different measurement system and the measurement system 100 display the different system's measurement result and the own measurement result through mapping, the different system's measurement result and the own measurement result may be image data. More specifically, a laser dust instrument being a different measurement system may acquire the image data indicating the dust position on a wafer, and the X-ray fluorescence spectrometer being the measurement system 100 may display, through mapping, measurement results of, for example, the concentrations of an element at the respective measurement positions on the wafer. In this case, the measurement system 100 may acquire and display, as the own measurement results, image data obtained by superimposing the different system's measurement results on the measurement results of, for example, the concentrations of the element at the respective measurement positions.

Further, the output data to be read may be stored in a storage device included in the measurement system 100, or may be stored in a storage device connected to the measurement system. 100 through a network.

Further, the value to be set in the "Position Data" field may not be the coordinates assigned to the frame selected on the output data display field 302 as long as the value indicates a position selected on the output data display field 302. Further, the example of using the position data of a position on a sample as the data for associating the measurement data of the measurement system 100 and the measurement data of the different measurement system with each other has been described above, but an ID or a lot number of the sample itself may be used.

Further, the measurement system 100 and the measurement method have been described above, but the present invention may be a program to be executed by a computer used for the measurement system 100 configured to obtain the own measurement result through use of the different system's measurement result obtained by a different measurement system. This computer is, for example, the information processing unit 124. This program is stored in a storage unit arranged inside the information processing unit 124 or a storage unit connected to the measurement system 100 through a network.

REFERENCE SIGNS LIST 100 measurement system, 102 sample, 104 primary X-rays, 106 fluorescent X-rays, 108 X-ray source, 110 sample stage, 112 spectroscopic device, 114 detector, 116 sample moving means, 118 counting unit, 120 display unit, 122 warning unit, 124 information processing unit, 202 output data acquisition unit, 204 designated position acquisition unit, 206 different system's measurement result acquisition unit, 208 measurement result acquisition unit, 210 position data storage unit, 302 output data display field, 304 management table, 306 checkbox, 308 "Paste from Clipboard" button, 310 "Import from CSV File" button, 312 "Clear Reference for All" button, 314 "OK" button, 316 "Cancel" button

The invention claimed is:

1. A measurement system, which is configured to obtain an own measurement result of the measurement system through use of a different system's measurement result obtained by a different measurement system, the measurement system comprising a computer configured to:
    acquire output data including the different system's measurement result, which has been obtained by the different measurement system;
    acquire a designated position, which is a position indicating an address at which the different system's measurement result is represented in the output data, by a user's designation;
    acquire the different system's measurement result at the designated position, which is included in the acquired output data;
    acquire the own measurement result through use of the acquired different system's measurement result; and
    store position data indicating the designated position,
    wherein the computer is configured to acquire, when the position data is already stored in a case where the computer acquires different output data obtained by the different measurement system, the different system's measurement result included at the designated position indicated by the position data.

2. The measurement system according to claim 1, further comprising a display configured to display the different system's measurement result included in the output data, wherein the computer is configured to acquire, as the position data, a position designated by the user, at which the different system's measurement result is presented, within the displayed different system's measurement result.

3. The measurement system according to claim 1, further comprising a warning unit configured to issue a warning to the user in a case where the output data acquired when the position data is stored and the different output data have different formats.

4. The measurement system according to claim 1, wherein the measurement system is an X-ray fluorescence spectrometer configured to analyze a sample based on fluorescent X-rays generated by irradiating a surface of the sample with primary X-rays.

5. The measurement system according to claim 4,
wherein the sample is a substrate having a surface on which a thin film is formed, and
wherein the different system's measurement result is a film thickness or a density of the thin film or a concentration of an element contained in the thin film, which has been measured by the different measurement system.

6. The measurement system according to claim 5,
wherein the output data includes a measurement position on the substrate, at which the film thickness has been measured, in association with the film thickness of the thin film, and
wherein the measurement system being the X-ray fluorescence spectrometer is configured to irradiate the measurement position with the primary X-rays to analyze, based on the generated fluorescent X-rays, the concentration of the element contained in the thin film or the density of the thin film.

7. A program to be executed by a computer used on a measurement system, which is configured to obtain an own measurement result of the measurement system through use of a different system's measurement result obtained by a different measurement system, the program causing the computer to execute:
an output data acquisition step of acquiring output data including the different system's measurement result, which has been obtained by the different measurement system;
a designated position acquisition step of acquiring a designated position, which is a position indicating an address at which the different system's measurement result is represented in the output data, by a user's designation;
a first different system's measurement result acquisition step of acquiring the different system's measurement result at the designated position, which is included in the output data acquired in the output data acquisition step, in order to acquire the own measurement result;
a position data storing step of storing position data indicating the designated position in a position data storage unit; and
a second different system's measurement result acquisition step of acquiring, when the position data is already stored in the position data storage unit in a case where different output data obtained by the different measurement system is acquired in the output data acquisition step, the different system's measurement result included at the designated position indicated by the position data.

8. A control method for a measurement system, which is configured to obtain an own measurement result of the measurement system through use of a different system's measurement result obtained by a different measurement system, the control method comprising:
an output data acquisition step of acquiring output data including the different system's measurement result, which has been obtained by the different measurement system;
a designated position acquisition step of acquiring a designated position, which is a position indicating an address at which the different system's measurement result is represented in the output data, by a user's designation;
a first different system's measurement result acquisition step of acquiring the different system's measurement result at the designated position, which is included in the output data acquired in the output data acquisition step;
a measurement result acquisition step of acquiring the own measurement result through use of the acquired different system's measurement result;
a position data storing step of storing position data indicating the designated position in a position data storage unit; and
a second different system's measurement result acquisition step of acquiring, when the position data is already stored in the position data storage unit in a case where different output data obtained by the different measurement system is acquired in the output data acquisition step, the different system's measurement result included at the designated position indicated by the position data.

* * * * *